US012643461B2

(12) United States Patent
Schulman et al.

(10) Patent No.: US 12,643,461 B2
(45) Date of Patent: Jun. 2, 2026

(54) METHOD OF INHIBITING MOVEMENT OF CARGO DURING TRANSPORT

(71) Applicant: Tropicana Products, Inc., Bradenton, FL (US)

(72) Inventors: Daniel Schulman, Jersey City, NJ (US); Renee Buelna-Roche, Jersey City, NJ (US)

(73) Assignee: Tropicana Products, Inc., Bradenton, FL (US)

( * ) Notice: Subject to any disclaimer, the term of this patent is extended or adjusted under 35 U.S.C. 154(b) by 510 days.

(21) Appl. No.: 18/162,150

(22) Filed: Jan. 31, 2023

(65) Prior Publication Data

US 2024/0253554 A1     Aug. 1, 2024

(51) Int. Cl.
| | |
|---|---|
| *B60P 7/08* | (2006.01) |
| *B60P 7/06* | (2006.01) |
| *B60P 7/16* | (2006.01) |
| *B61D 45/00* | (2006.01) |
| *B63B 25/24* | (2006.01) |

(52) U.S. Cl.
CPC ................ B60P 7/065 (2013.01); B60P 7/16 (2013.01); *B61D 45/00* (2013.01); *B63B 25/24* (2013.01)

(58) Field of Classification Search
CPC .. B60P 7/065; B60P 7/16; B60P 3/007; B60P 3/055; B60P 7/0892; B60P 7/14; B63B 25/24
USPC ................ 410/118–119, 125, 128, 154–155
See application file for complete search history.

(56) References Cited

U.S. PATENT DOCUMENTS

| | | | |
|---|---|---|---|
| 2,990,070 | A | 6/1961 | Cushman |
| 3,098,455 | A | 7/1963 | McElroy et al. |
| 3,131,648 | A * | 5/1964 | Seger ...................... B60P 7/065 410/119 |
| 3,427,995 | A | 2/1969 | Stafford, Jr. |
| 3,427,997 | A | 2/1969 | Brown, Jr. et al. |
| 3,462,027 | A | 8/1969 | Puckhaber |
| 3,506,143 | A | 4/1970 | Evans |
| 3,554,135 | A * | 1/1971 | Duvall ................... B60P 7/065 410/119 |
| 3,556,318 | A | 1/1971 | Hollis et al. |
| 3,667,625 | A | 6/1972 | Lucas |
| 3,808,981 | A | 5/1974 | Shaw |
| 3,847,091 | A | 11/1974 | Holt |
| 3,863,784 | A | 2/1975 | Webb |
| 4,310,271 | A | 1/1982 | Canellis et al. |
| 4,553,887 | A | 11/1985 | Reeves |
| 5,000,376 | A | 3/1991 | Wojdyla |
| 5,288,188 | A | 2/1994 | Vance |
| 5,486,078 | A * | 1/1996 | Wise ......................... B60P 7/16 410/154 |
| 6,322,303 | B1 | 11/2001 | John |
| 6,457,921 | B1 | 10/2002 | Freeman |
| 6,746,190 | B2 | 6/2004 | Freeman |

(Continued)

*Primary Examiner* — Stephen T Gordon
(74) *Attorney, Agent, or Firm* — Loeb & Loeb LLP

(57) ABSTRACT

A method of protecting freight in a cargo area of a freight carrier may include providing a first and second pallet in the cargo area adjacent to and spaced from each other, each pallet having a top surface supporting cargo and four side walls extending from the top surface in a direction away from the cargo; and providing pallet dunnage in the space between the first and second pallet such that the pallet dunnage contacts respective opposing side walls of the first and second pallet.

17 Claims, 6 Drawing Sheets

(56) References Cited

U.S. PATENT DOCUMENTS

| | | | |
|---|---|---|---|
| 7,011,480 B2 | 3/2006 | Ahlert et al. | |
| 7,128,510 B2 | 10/2006 | Ahlert et al. | |
| 7,137,765 B1 | 11/2006 | Elze et al. | |
| 7,322,781 B2 | 1/2008 | Bullock | |
| 7,510,359 B2 | 3/2009 | Sperry et al. | |
| 7,708,508 B2 | 5/2010 | Bullock | |
| 7,726,920 B2 | 6/2010 | Bullock | |
| 7,789,604 B2 | 9/2010 | Rotche | |
| 7,882,954 B2 | 2/2011 | Davlin et al. | |
| 8,201,690 B1 | 6/2012 | Gess | |
| 8,234,844 B2 | 8/2012 | Davlin et al. | |
| 8,251,624 B2 | 8/2012 | Tschantz et al. | |
| 8,398,344 B2 | 3/2013 | Bullock | |
| 8,459,915 B1 | 6/2013 | Gess | |
| 8,636,453 B2 | 1/2014 | Starnes | |
| 8,668,418 B2 | 3/2014 | Root | |
| 9,333,899 B1 | 5/2016 | Bullock | |
| 9,371,147 B2 | 6/2016 | Straver | |
| 9,637,044 B2 | 5/2017 | Bullock | |
| 9,896,256 B2 | 2/2018 | Pansegrouw | |
| 9,969,316 B2 | 5/2018 | Pansegrouw | |
| 10,427,583 B2 | 10/2019 | Bullock | |
| 10,562,437 B2 | 2/2020 | Pansegrouw | |
| 11,155,199 B2 | 10/2021 | Pansegrouw | |
| 11,220,205 B2 | 1/2022 | Bullock | |
| 2002/0136614 A1 | 9/2002 | Elze et al. | |
| 2004/0141824 A1 | 7/2004 | Ahlert et al. | |
| 2006/0115342 A1 | 6/2006 | Ahlert et al. | |
| 2006/0188356 A1* | 8/2006 | Tschantz | B60P 7/065 |
| | | | 410/119 |
| 2007/0172326 A1 | 7/2007 | Sperry et al. | |
| 2008/0181743 A1 | 7/2008 | Bullock | |
| 2008/0190807 A1 | 8/2008 | Rotche | |
| 2010/0006176 A1 | 1/2010 | Pansegrouw | |
| 2010/0183397 A1 | 7/2010 | Bullock | |
| 2012/0099941 A1* | 4/2012 | Larsh | B60P 7/135 |
| | | | 410/121 |
| 2012/0269594 A1 | 10/2012 | Starnes | |
| 2012/0294692 A1 | 11/2012 | Root | |
| 2013/0205724 A1 | 8/2013 | Straver | |
| 2016/0130062 A1 | 5/2016 | Pansegrouw | |
| 2016/0250962 A1 | 9/2016 | Bullock | |
| 2016/0347231 A1 | 12/2016 | Pansegrouw | |
| 2016/0347232 A1 | 12/2016 | Pansegrouw | |
| 2017/0225695 A1 | 8/2017 | Bullock | |
| 2018/0170649 A1 | 6/2018 | Pansegrouw | |
| 2019/0359114 A1 | 11/2019 | Bullock | |
| 2020/0148091 A1 | 5/2020 | Pansegrouw | |
| 2022/0097595 A1 | 3/2022 | Bullock | |

* cited by examiner

METHOD OF INHIBITING MOVEMENT OF CARGO DURING TRANSPORT

This disclosure relates to methods of protecting freight in a cargo area of a freight carrier. The described methods also relate to methods of inhibiting movement of cargo in a cargo area of a freight carrier and thus, inhibiting damage to the cargo during transport.

BACKGROUND

Transporting freight is an integral part of virtually every industry. Freight carriers such as trucks, railroad cars, airplanes, ships, etc., are all commonly used to transport goods. Products are commonly shipped as stacks of cargo on pallets placed in the cargo space or area of a freight carrier such as a truck trailer or container. After placing the cargo in the cargo area, it is generally desirable to support the cargo in the cargo area to prevent damage due to shifting. A common practice is to position two rows of cargo on pallets, each row extending from the front to the rear of the container. The space between the cargo in the rows oftentimes is provided with dunnage in an attempt to prevent the cargo from moving.

One form of dunnage includes inflatable and disposable dunnage bags that include a gastight bladder, usually constructed from polyethylene material, surrounded by an outer protective and supportive casing consisting of at least one ply of paper material. These dunnage bags are used to fill spaces between cargo or between the cargo and the walls of the freight carriers in order to prevent the cargo from shifting and damaging either the cargo itself and/or the walls of the freight carrier. The dunnage bags are typically placed between the cargo in a deflated condition and are subsequently inflated with a fluid such as gas. The is pressure of the gas in the dunnage bags is determined by the application, the size and wall composition of the dunnage bags.

The problem of damage to cargo during transport has such a commonality and severity that the American Association of Rail Roads (AARR) has adopted standardized requirements for an acceptable protection system. These requirements for dunnage bags include an "80% footprint" where a footprint is the area of contact of the interface between the wall of the cargo and the bag. This specification satisfies the two requirements that the interface of the bag exert sufficient force over a broad area of the bag to support the product without crushing the cargo such as when the cargo might be bottles of fruit juice.

The AARR has also developed a uniform testing procedure that any shipping system must pass in order that the participating company receive the required approval from the AARR to apply that system as a basis for its shipping procedure. The test, referred to as the AARR test, which is incorporated by reference into this specification, is described as follows:

1. A first railcar, loaded with 45,000 pounds, is positioned on a railroad track.
2. Additional railcars having a total weight of 275,000 pounds are accelerated to a speed of 3 miles per hour and caused to slam into the first car.
3. This procedure is repeated a total of 3 times at speeds of 6 miles per hour each time.
4. The spacers are examined to determine any damage that has occurred to the spacers such as rupture of dunnage bags, etc. The amount of movement is measured to determine the effectiveness of the air bags.

Despite the many attempts and solutions provided to ameliorate the damage to goods during transport, damage still occurs. In view of this longstanding need to solve the above problem(s), the inventors have invented methods of inhibiting movement of cargo in a cargo area of a freight carrier and thus, inhibiting damage to the cargo during transport.

SUMMARY

In one aspect, a method of protecting freight in a cargo area of a freight carrier is described. Generally the cargo area includes a top, a floor spaced from the top and configured to receive and support cargo, with a first and second opposing side walls that join at least a portion of the top and the floor. The method may include providing a first and second pallet in the cargo area adjacent to and spaced from each other. Each pallet has a top surface supporting cargo and four side walls extending from the top surface in a direction away from the cargo. Thereafter, pallet dunnage may be provided in the space between the first and second pallet such that the pallet dunnage contacts respective opposing side walls of the first and second pallet.

In some aspects, the pallet dunnage fills or substantially fills the space between a pallet loaded with cargo and a neighboring or adjacent pallet loaded with cargo by providing pallet dunnage in contact with the opposing side edges of the adjacent pallets. In some instances, the pallet dunnage makes only minimal contact with the cargo and in other instances, the pallet dunnage does not contact the cargo.

In one embodiment, the pallet dunnage may be in the form of a pallet dunnage bag that includes an airtight bladder and a valve in fluid connection with an interior of the bladder to permit fluid to enter and exit the bladder. In some instances the fluid is a gas.

In other aspects, the method may include providing a third and fourth pallet each having a substantially flat top surface supporting cargo, four side walls extending from the top surface in a direction away from the cargo, and a bottom surface in contact with the top of cargo being supported by one of the first or second pallets. In this instance, the method may further include providing second pallet dunnage in a space between the third and fourth pallets such that the second pallet dunnage contacts opposing side walls of the third and fourth pallets.

In some instances, it may be desirable to provide additional dunnage in the form of cargo dunnage. In these instances, cargo dunnage may be provided in the space between opposing sides of cargo located on the adjacent first and second pallets. In addition, where pallets are stacked, e.g., a third pallet is stacked on cargo provided on the first pallet and a fourth pallet is stacked on cargo provided on the second pallet, cargo dunnage may be provided in the space between opposing sides of cargo located on the adjacent third and fourth pallets.

According to other aspects, it may be desirable to provide pallet wall dunnage between the first cargo area side wall and a side wall of the first pallet and/or between the second cargo area side wall and a side wall of the second pallet. Similarly, it may be desirable to provide cargo wall dunnage between the first cargo area side wall and cargo provided on one of the first or second pallets, providing cargo wall dunnage between the second cargo area side wall and cargo provided on the other of the first or second pallets, or both. It is also contemplated that the pallets are located adjacent to and, in some instances, abutting the walls of the cargo area (e.g., the front and one or both side walls) and, as such, pallet wall dunnage would not be present.

Where pallets are stacked with cargo, it may be desirable to provide pallet wall dunnage between the first cargo area side wall and a side wall of the third pallet and/or between the second cargo area side wall and a side wall of the fourth pallet. Similarly, it may be desirable to provide cargo wall dunnage between the first cargo area side wall and cargo provided on one of the third or fourth pallets, providing cargo wall dunnage between the second cargo area side wall and cargo provided on the other of the third or fourth pallets, or both.

Optionally, buffer material may be employed intermediate the dunnage (any of pallet dunnage, cargo dunnage, or wall dunnage) and the cargo. The buffer material may be rigid, such as plywood or particle board, for cargo that is crushable and lack stiffness; or soft, such as corrugated, for cargo that is solid, self-supporting and does not have sharp protrusions. The buffer material is typically substantially the same size as the dunnage and typically covers substantially the entire side surface of the cargo.

The term "pallet" refers to a structure having a substantially flat top used to support cargo and a bottom in contact with a floor of a freight carrier or, in some instances with cargo (i.e., in a stacked arrangement). The top and bottom may be of a single piece or multiple pieces (aligned strips of, for example wood). The pallet has four sides two of which (generally two opposite sides) are typically configured to be accessed by forks of a fork-lift. The pallet may be made of any suitable material but in many instances, it is made of wood.

Other aspects and advantages of this invention will be appreciated from the following detailed description.

DETAILED DESCRIPTION

Figure 1:
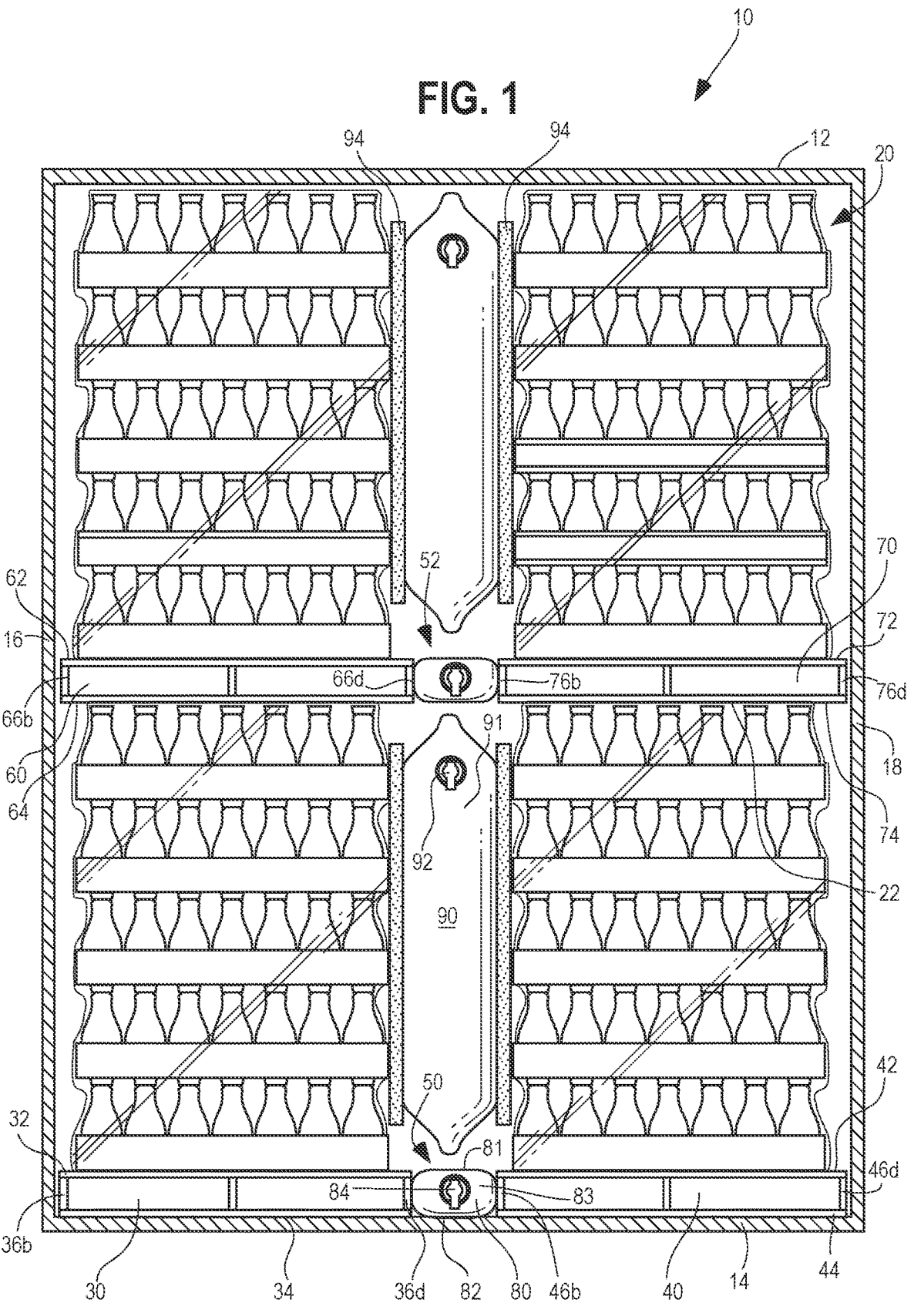
FIG. 1 is an end view of an exemplary row of cargo located in a cargo area of a freight carrier and arranged in two columns and having two stacks of pallets with one of the pallets in each column and each stack being supported by the floor of the cargo area. A pallet dunnage is located in the space between two adjacent pallets. In addition, cargo dunnage is provided in the space between two adjacent cargo.
Figure 2:
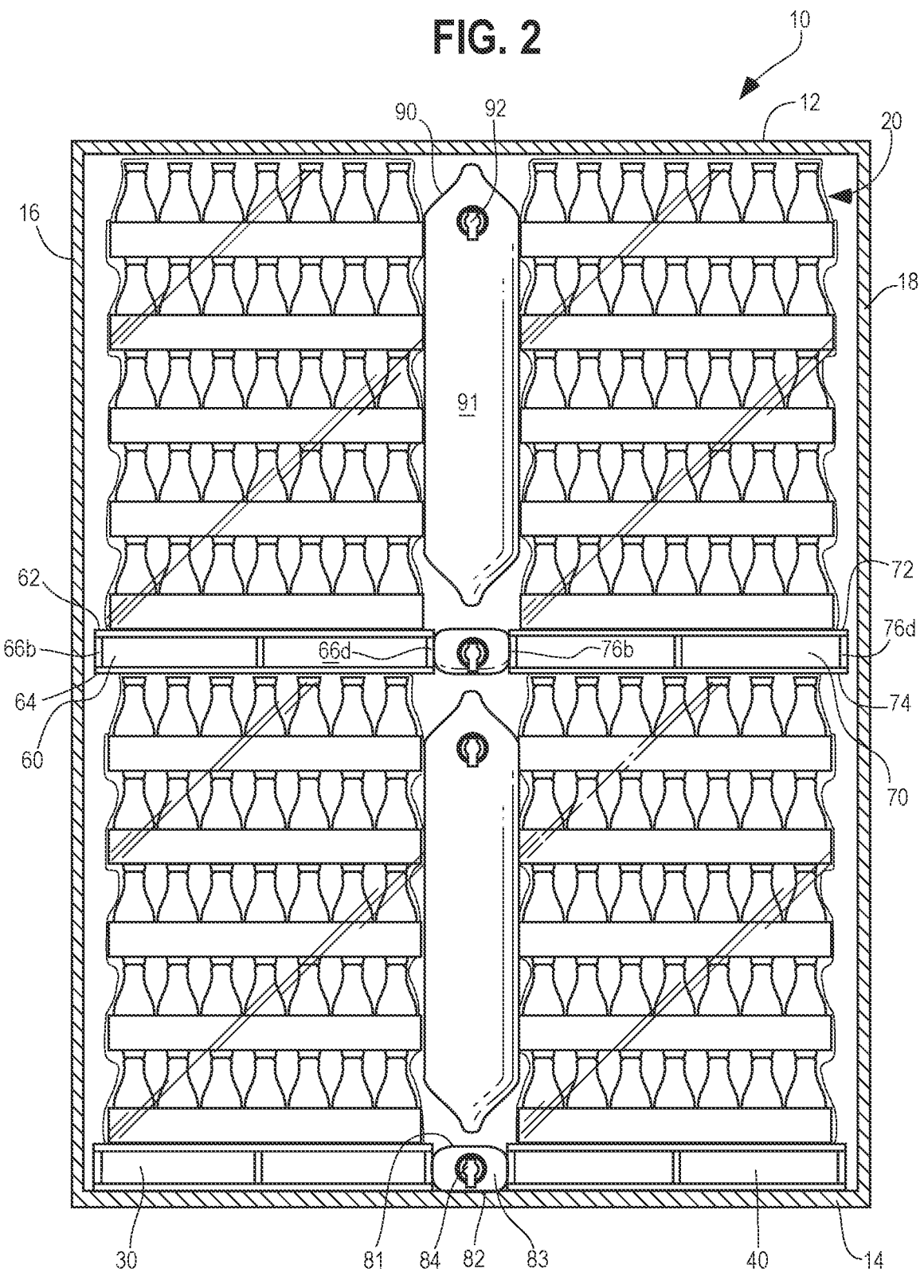
FIG. 2 is an end view of an exemplary row of cargo located in a cargo area of a freight carrier and arranged in two columns and having two stacks of pallets with one of the pallets in each column and each stack being supported by the floor of the carrier. A pallet dunnage is located in the space between two adjacent pallets. In addition, cargo dunnage is provided in the space between two adjacent cargo.

Turning now to FIG. 1, one embodiment of a method for protecting freight in a cargo area 10 of a freight carrier will be described. As shown in FIG. 1, the cargo area 10 includes a top 12, a floor 14 spaced from the top 12 and configured to receive and support cargo 20, and two opposing side walls 16, 18 that join at least a portion of the top and the floor. Cargo areas for freight carriers such as trucks, railroad cars, airplanes, and ships, may include an opening (not shown) through which the cargo can be moved into and out of the cargo area. For example, the cargo area of a truck generally has a closable rear door through which the cargo can be moved. As another example, railroad cars typically have a closable side door through which the cargo can be moved. Generally, for any type of freight carrier, there is provided at least a floor and two opposed and spaced apart side walls extending from the floor.

Oftentimes, cargo 20 is loaded on a pallet 30, 40, 60, 70. With reference to the first pallet, 30, each pallet 30, 40, 60, 70 has a substantially flat top surface 32 on which the cargo 20 is received, a substantially flat bottom 34 that is in contact with the floor of the cargo area 14 or the top of adjacent cargo 22 (if two or more pallets are stacked, as shown in FIG. 1), and four side walls 36a, 36b, 36c, 36d joining the top 32 and bottom surfaces 34 to form a square or rectangle (best seen in FIG. 5). After the cargo is loaded onto a pallet, the cargo may be wrapped with film to secure it to the pallet or may be secured to the pallet in any other known manner. Thereafter, the pallet may be moved into or provided in the cargo area.

Figure 5:
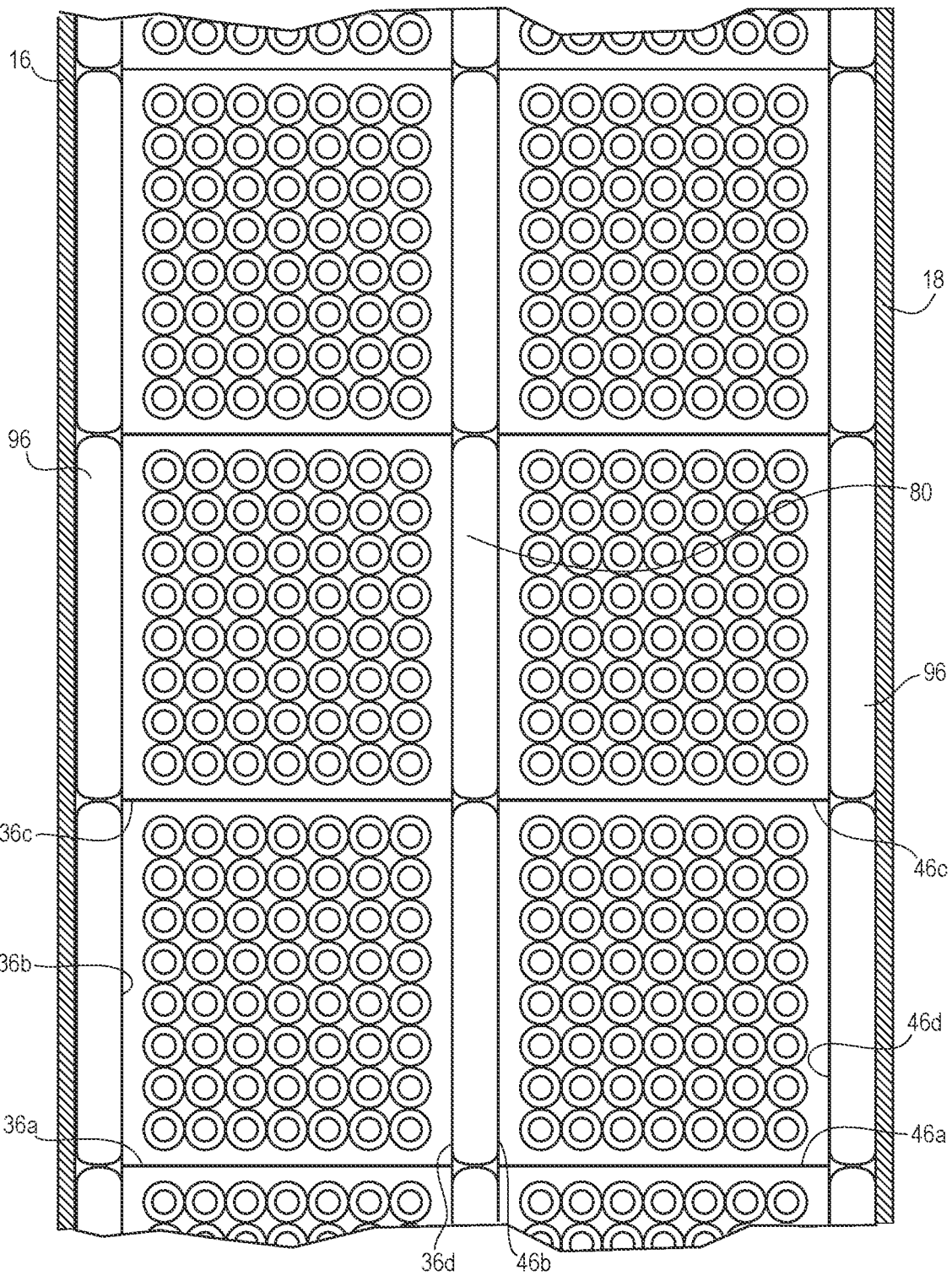
FIG. 5 is a top view of several rows of cargo located in a cargo area of a freight carrier and arranged in two columns. Dunnage is shown as being (i) provided between one side wall of the cargo area and one side of a pallet, (ii) provided between two adjacent pallets, and (iii) provided between one side of an adjacent pallet and another side wall of the cargo area.

As shown in FIG. 1, only a single row of pallets is shown but the skilled artisan will appreciate that the cargo area may contain several rows of pallets, as partially depicted in FIG. 5. In addition, the pallets (and thus the cargo) may be arranged in columns, which with respect to the cargo area depicted in FIG. 1, substantially fills the width of the cargo area (i.e., the distance from the first side wall to the second side wall of the cargo area). For ease of description and explanation, the loading and arrangement of the pallets will be explained using two columns, as shown in the figures, although the skilled artisan will appreciate that the described principles could be applied when only a single column or more than two columns are provided in the cargo area.

Turning momentarily to FIG. 5, the first pallet 30 has a first 36a, second 36b, third 36c, and fourth side wall 36d. The second side wall 36b in this embodiment is adjacent to the first side wall 16 of the cargo area. A second pallet 40 has a first 46a, second 46b, third 46c, and fourth side wall 46d. The fourth side wall 46d of the second pallet 40 is adjacent to the second side wall 18 of the cargo area. With that arrangement in mind and turning back to FIG. 1, it will be appreciated that the second side wall 36b of the first pallet 30 is adjacent to and/or abutting the first side wall 16 of the cargo area and that the fourth side wall 46d of the second pallet 40 is adjacent to and/or abutting the second side wall 18 of the cargo area. It will also be appreciated that the first 30 and second pallets 40 are spaced apart. In other words, there is a space 50 between the fourth wall 36*d* of the first pallet 30 and the second wall 46*b* of the second pallet 40. Each of the first 30 and second pallets 40 has a substantially flat top surface 32, 42, respectively, that supports cargo 20, in this instance depicted as cases of bottles, and a substantially flat bottom 34, 44, respectively, that is in contact with the floor 14 of the cargo area 10.

In some embodiments and as shown in, for example, FIG. 1, the method may include providing a third 60 and fourth pallet 70. Similar to the first 30 and second pallets 40, each of the third 60 and fourth pallets 70 have a substantially flat top surface 62, 72 supporting cargo 20, four side walls 66*a*, 66*b*, 66*c*, 66*d*, 76*a*, 76*b*, 76*c*, 76*d* extending from the top surface 62, 72, and a bottom surface 64, 74 in contact with the top 22 of the cargo being supported by one of the first 30 or second pallets 40. The third pallet 60 has a first 66*a*, second 66*b*, third 66*c*, and fourth side wall 66*d*. The second side wall 66*b* in this embodiment is adjacent to the first side wall 16 of the cargo area. The fourth pallet 70 has a first 76*a*, second 76*b*, third 76*c*, and fourth side wall 76*d*. The fourth side wall 76*d* of the second pallet 70 is adjacent to the second side wall 18 of the cargo area. It will be appreciated that the second side wall 66*b* of the third pallet 60 is adjacent to and/or abutting the first side wall 16 of the cargo area and that the fourth side wall 76*d* of the fourth pallet 70 is adjacent to and/or abutting the second side wall 18 of the cargo area. It will also be appreciated that the third 60 and fourth pallets 70 are spaced apart. In other words, there is a space 52 between the fourth wall 66*d* of the third pallet 60 and the second wall 76*b* of the fourth pallet 70.

The method further includes providing pallet dunnage 80 in the space 50 between the first 30 and second pallet 40 such that the pallet dunnage 80 contacts respective opposing side walls of the first 30 and second pallet 40, i.e., the fourth wall 36*d* of the first pallet 30 and the second wall 46*b* of the second pallet 40. The pallet dunnage 80 extends from a first side wall normal to the opposing side wall of the first pallet toward a second side wall opposite the first side wall and normal to the opposing side wall of the first pallet. In other words, the pallet dunnage 80 extends from the first side wall 36*a* of the first pallet 30 toward the third side wall 36*c* of the first pallet 30. In some instances, the pallet dunnage 80 extends the entire length from the first side wall 36*a* of the first pallet 30 to the third side wall 36*c* of the first pallet 30.

The pallet dunnage 80 has a top 81 and a bottom 82 with the bottom 82 lying in substantially the same plane as the bottom 34, 44 of either the first 30 or second pallet 40. In addition, it may be advantageous if the pallet dunnage 80 does not contact the cargo 20 so that the force exerted by the pallet dunnage 80 is concentrated on the side walls of the pallets, which may minimize damage to the cargo.

Figure 4:
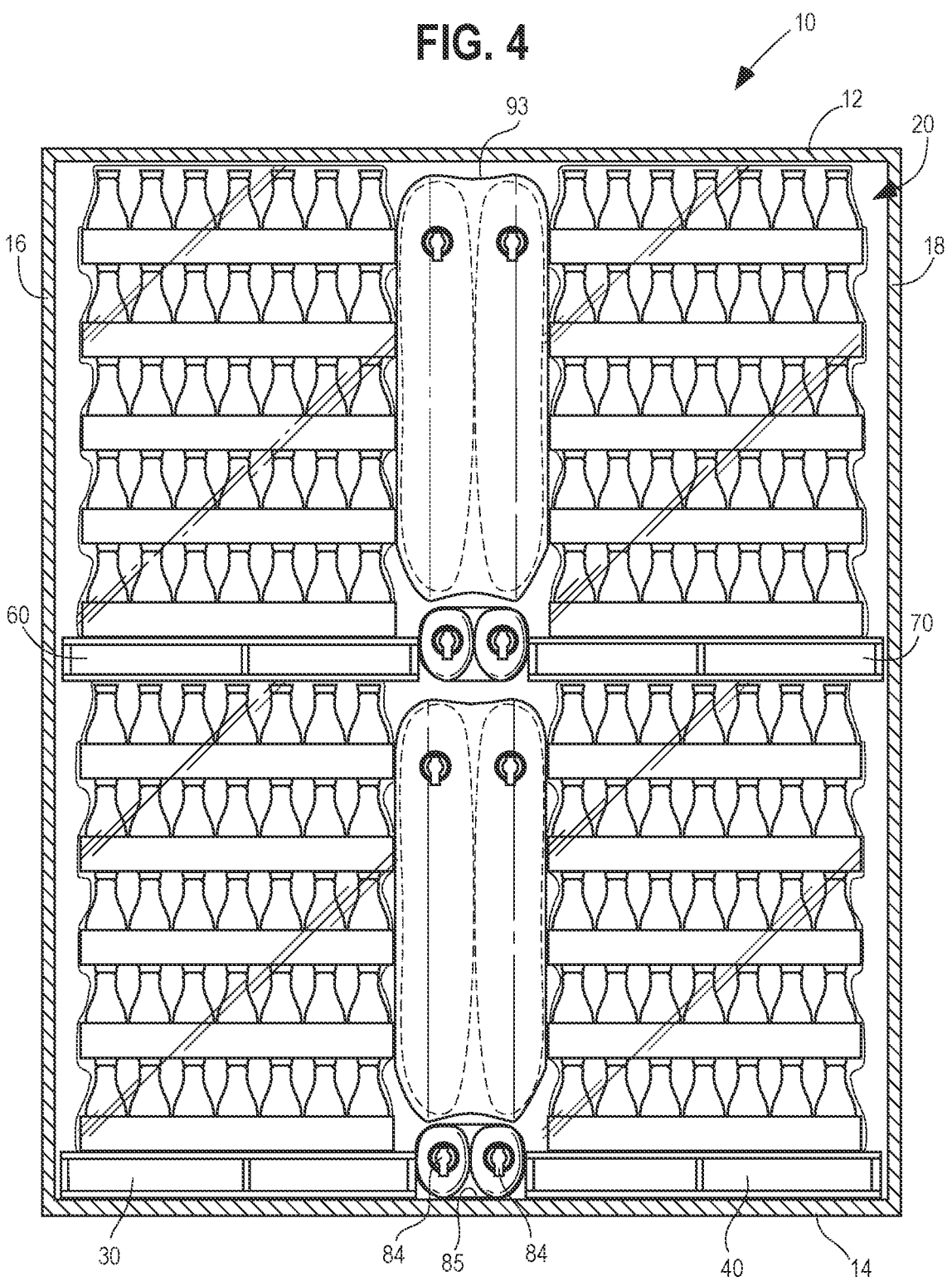
FIG. 4 is an end view of an exemplary row of cargo located in a cargo area of a freight carrier and arranged in two columns and having two stacks of pallets with one of the pallets in each column and each stack being supported by the floor of the carrier. A pallet dunnage is located in the space between two adjacent pallets. In addition, cargo dunnage is provided in the space between two adjacent cargo.

The pallet dunnage 80 may take any suitable form so long as it can exert a force primarily (and in some instances, exclusively) on the side walls of adjacent pallets. As depicted in FIG. 1, the pallet dunnage 80 includes an airtight bladder 83 and a valve 84 in fluid connection with an interior of the bladder 83 to permit fluid to enter and exit the bladder 83. It will be appreciated that the configuration of the pallet dunnage 80 may vary and, in some embodiments, it is contemplated that the pallet dunnage 80 includes two airtight bladders 83, each having a valve 84 in fluid connection with an interior of their respective bladder 83 to permit fluid to enter and exit the bladder 83, as depicted in FIG. 4. In this instance, the two airtight bladders 83 may be configured as a single structure such as by enclosing the bladders 83 with an outer shell or wrapping 85. It is also contemplated that the pallet dunnage 80 may be configured with more than two airtight bladders 83.

While the figures depict a stacking of cargo that is two pallets high, i.e., two pallets are used with one resting on the floor and the other resting on top of the cargo provided on the pallet resting on the floor, it is contemplated that the stacking may be greater than two pallets high, e.g., three, four, five, six, seven, etc. Still referring to FIG. 1, it will be appreciated that when the cargo (and pallets) are stacked on each other (i.e., vertically stacked on top of each other), as noted above, the third 60 and fourth pallets 70 are spaced from each other such that the fourth wall 66*d* of the third pallet 60 is spaced from the second wall 76*b* of the fourth pallet 70. In this instance, it may be advantageous to provide a second pallet dunnage 80 in the space 52 between the third 60 and fourth pallet 70 such that the second pallet dunnage 80 contacts the fourth side 66*d* wall of the third pallet 60 and the second side wall 76*b* of the fourth pallet 70.

Similar to the first pallet dunnage described above, the second pallet dunnage may extend from the first side wall 66*a* of the third pallet 60 toward the third side wall 66*c* of the third pallet 60. In some instances, the second pallet dunnage 80 extends the entire length from the first side wall 66*a* of the third pallet 60 to the third side wall 66*c* of the third pallet 60. The second pallet dunnage has a top and a bottom, such that in some instances, the bottom lies in substantially the same plane as a bottom of either the third or fourth pallet. In addition, it may be advantageous if the second pallet dunnage does not contact the cargo so that the force exerted by the pallet dunnage is concentrated on the side walls of the pallet, which may minimize damage to the cargo.

The second pallet dunnage may have the same physical configuration as the first pallet dunnage or it may differ. In the latter situation, the first pallet dunnage may include two (or more) airtight bladders while the second pallet dunnage includes only a single airtight bladder or vice versa.

The method may further include providing cargo dunnage 90 in the space between opposing sides of cargo on the first 30 and second pallets 40, as shown in FIG. 1. In a similar manner, the method may further include providing cargo dunnage 90 in the space between opposing sides of cargo on the third 60 and fourth pallets 70. Cargo dunnage, when provided, may be arranged so that it does not contact a pallet 30, 40, 60, 70.

The cargo dunnage 90 may take any suitable form so long as it is able to exert a force primarily (and in some instances, exclusively) on the cargo 20 provided on the adjacent pallets. As depicted in FIG. 1, the cargo dunnage 90 includes an airtight bladder 91 and a valve 92 in fluid connection with an interior of the bladder to permit fluid to enter and exit the bladder 91. It will be appreciated that the configuration of the cargo dunnage may vary and, in some embodiments, it is contemplated that the cargo dunnage includes two airtight bladders, each having a valve in fluid connection with an interior of their respective bladder to permit fluid to enter and exit the bladder, as best seen in FIG. 4. In this instance, the two airtight bladders may be configured as a single structure such as by enclosing the bladders with an outer shell or wrapping 93. It is also contemplated that the cargo dunnage may be configured with more than two airtight bladders.

In addition, while the pallet dunnage 80 and cargo dunnage 90 are shown as separate structures it is contemplated that they could be provided as a single structure containing multiple airtight bladders each having an associated valve.

Optionally and as depicted in FIG. 1, buffer material 94 may be employed intermediate the cargo dunnage 90 and the cargo 20. The buffer material 94 has at least two functions. First, when the dunnage (any of pallet dunnage, cargo dunnage, or wall dunnage) includes an airtight bladder, the buffer material 94 protects the dunnage from abrasions and puncture by offering a smooth surface. Second, the buffer material 94 may act to distribute the force exerted by the dunnage, particularly when the dunnage includes an airtight bladder, preventing concentration of forces, which may cause crushing or damage to the cargo. The buffer material 94 may be rigid, such as plywood or particle board, or soft, such as corrugated. The buffer material 94 may be substantially the same size as the dunnage and may cover substantially the entire side surface of the cargo 20. As a result and, as can be appreciated upon viewing FIG. 1, the cargo dunnage 90 is sandwiched between the buffer material 94.

Figure 3:
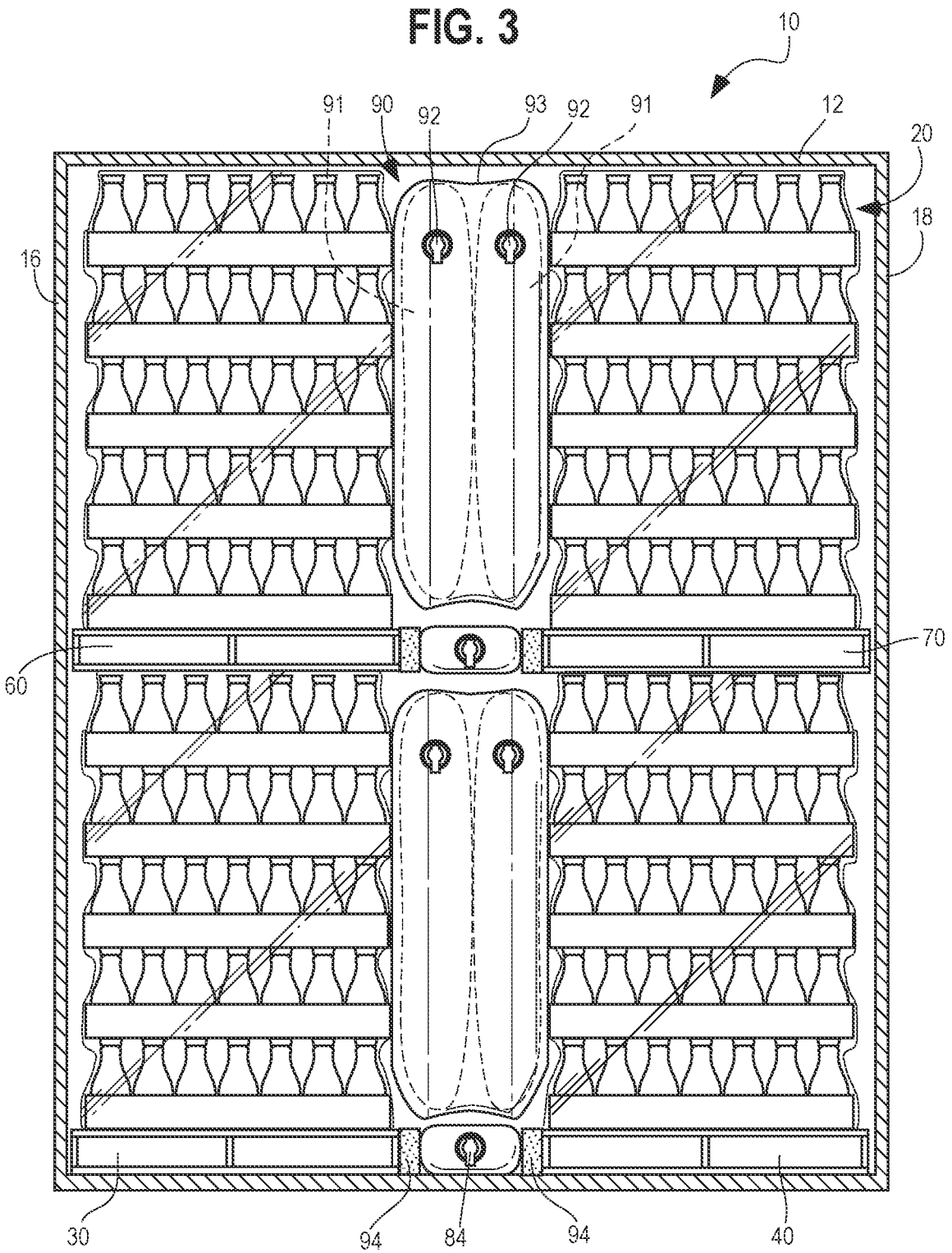
FIG. 3 is an end view of an exemplary row of cargo located in a cargo area of a freight carrier and arranged in two columns and having two stacks of pallets with one of the pallets in each column and each stack being supported by the floor of the carrier. A pallet dunnage is located in the space between two adjacent pallets. In addition, cargo dunnage is provided in the space between two adjacent cargo.

As shown in FIG. 3, it is contemplated to provide a buffer material 94 intermediate the pallet dunnage 80 and side walls of the first 30, second 40, third 60, and/or fourth pallet 70. While the buffer material 94 shown in FIGS. 1 and 3, is provided as separate materials, i.e., intermediate the cargo dunnage 90 and the cargo 20 (FIG. 1) or intermediate the pallet dunnage 80 and the side of wall of a pallet 30, 40, 60, 70 (FIG. 3), it is contemplated that a single buffer material 94 may be provided and may extend the entire height of the stacked pallets, i.e., from the floor 14 or adjacent the floor 14 of the cargo area to the top or nearly to the top of the stacked cargo 20.

Turning now to FIG. 5, another aspect of the described method is shown. In this instance, a wall dunnage 96 is additionally provided between the first side wall 16 of the cargo area 10 and the second side wall 36b of the first pallet 30 (and/or the second side wall 66b of the third pallet 60) and between the second side wall 18 of the cargo area 10 and the fourth side wall 46d of the second pallet 40 (and/or the fourth side wall 76d of the fourth pallet 70), as well as providing a pallet dunnage 80 in the space between two spaced apart pallets, as described above. It will be appreciated that the wall dunnage 96 may only need to be provided in contact with one of the side walls of the cargo area and the adjacent pallet. In addition, it is contemplated that cargo dunnage may be provided in the space between the cargo and each or both of the first and second side walls of the cargo area.

Figure 6:
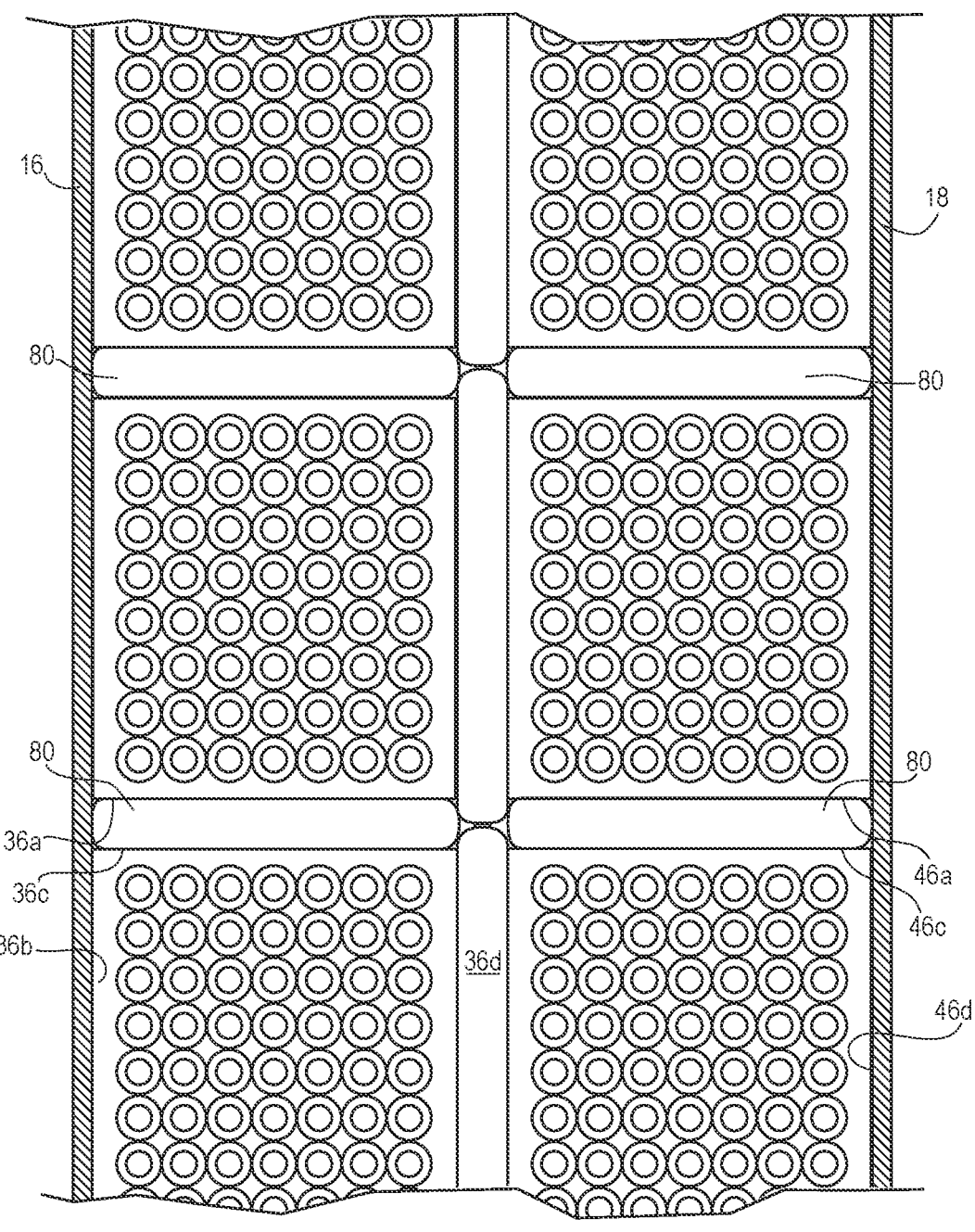
FIG. 6 is a top view of several rows of cargo located in a cargo area of a freight carrier and arranged in two columns. Dunnage is shown as being provided between two adjacent pallets, i.e., side to side, as well as front to back.

Referring to FIG. 6, another aspect of the described method is shown. In this instance, FIG. 6 depicts a portion of a cargo area 10 having a first side wall 16 and a second side wall 18. It will be appreciated that if the cargo area 10 was in the form of, for example, a truck, the top of FIG. 6 may be considered to be at the front of the truck and the bottom of FIG. 6 may be considered to be at the rear of the truck. As shown in FIG. 6 a row of first pallets 30 are arranged in a column and a row of second pallets 40 are arranged adjacent to the first row of first pallets 30 (visually to the right). A side 36b of the first pallets 30 is adjacent to and, in some instances, may abut the wall 16 of the cargo area 10. Likewise, a side 46d of the second pallets is adjacent to and, in some instances, may abut the wall 18 of the cargo area 10.

FIG. 6 also shows pallet dunnage 80 located between adjacent pallets in the row of first pallets 30 and between adjacent pallets in the row of second pallets 40. Specifically, a pallet dunnage 80 is located between the third wall 36c on a first pallet 30 and the first wall 36a of an adjacent first pallet 30. Similarly, a pallet dunnage 80 is located between the third wall 46c on a second pallet 40 and the first wall 46a of an adjacent second pallet 40. In addition, as noted with FIG. 5, a pallet dunnage 80 may be provided between the adjacent columns of the first pallets 30 and the second pallets 40. In this regard, a pallet dunnage may be provided between the fourth wall 36d of a first pallet 30 and the second wall 46b of a second pallet.

It is also contemplated that the cargo may be placed adjacent and/or abutting the front wall of the cargo area (not shown).

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. A method of protecting freight in a cargo area of a freight carrier, the method comprising:
   providing a first and second pallet in the cargo area adjacent to and spaced from each other, each pallet having a top surface supporting cargo and four side walls extending from the top surface in a direction away from the cargo, wherein the four side walls include a first, second, third, and fourth side wall; and
   providing pallet dunnage in the space between the first and second pallet such that the pallet dunnage contacts respective opposing ones of the four side walls of the first and second pallet, wherein the pallet dunnage does not contact the cargo.

2. The method of claim 1 wherein (i) the first and third side walls of each of the first and second pallets are opposed to and generally parallel to each other, and (ii) the second and fourth side walls of each of the first and second pallets are opposed to and generally parallel to each other, and normal to the first and third side walls, and wherein the pallet dunnage extends parallel to the second and fourth side walls of each of the first and second pallets and from the first side wall toward the third side wall.

3. The method of claim 2 wherein the pallet dunnage extends an entire length from the first side wall of the first pallet to the third side wall of the first pallet.

4. The method of claim 1 wherein the pallet dunnage has a bottom with the bottom lying in substantially a same plane as a bottom of either the first or second pallet.

5. The method of claim 1 wherein the pallet dunnage includes an airtight bladder and a valve in fluid connection with an interior of the bladder to permit fluid to enter and exit the bladder.

6. The method of claim 1 further comprising providing a third and fourth pallet each pallet having a top surface supporting cargo, a bottom surface in contact with a top of cargo provided on the cargo being supported by one of the first or second pallets, and four side walls joining at least a portion of the top surface and the bottom surface, wherein the four side walls of the third and fourth pallet include a first, second, third, and fourth side wall.

7. The method of claim 6 further comprising providing second pallet dunnage in a space between the third and fourth pallet such that the second pallet dunnage contacts opposing ones of the four side walls of the third and fourth pallet.

8. The method of claim 7 wherein (i) the first and third side walls of each of the third and fourth pallets are opposed to and generally parallel to each other, and (ii) the second and fourth side walls of each of the third and fourth pallets are opposed to and generally parallel to each other and normal to the first and third side walls of each of the third and fourth pallets, and wherein the second pallet dunnage extends parallel to the second fourth side walls of each of the third and fourth pallets and from the first side wall of the third or fourth pallet toward the third side wall of the third or fourth pallet.

9. The method of claim 8 wherein the second pallet dunnage extends an entire length from the first side wall of the third pallet to the second side wall of the third pallet.

10. The method of claim 7 wherein the second pallet dunnage has a bottom with the bottom lying in substantially a same plane as a bottom of either the third or fourth pallet.

11. The method of claim 7 wherein the second pallet dunnage does not contact the cargo on the first, second, third, or fourth pallet.

12. The method of claim 7 wherein the second pallet dunnage includes an airtight bladder and a valve in fluid connection with an interior of the bladder to permit fluid to enter and exit the bladder.

13. The method of claim 1 further comprising providing first cargo dunnage in a space between opposing sides of cargo on the first and second pallets.

14. The method of claim 13 wherein the first cargo dunnage does not contact a pallet.

15. The method of claim 1 wherein the cargo area includes a floor from which first and second opposed and spaced apart cargo area side walls extend and the method further comprises providing pallet wall dunnage between the first cargo area side wall and a side wall of one of the first or second pallets and/or providing pallet wall dunnage between the second cargo area side wall and a side wall of another of the first or second pallets.

16. The method according to claim 15 wherein the method further comprises providing cargo wall dunnage between the first cargo area side wall and cargo provided on one of the first or second pallets and/or providing cargo wall dunnage between the second cargo area side wall and cargo provided on another of the first or second pallets.

17. The method of claim 1 wherein the freight carrier is selected from a truck, railroad car, airplane, or ship.

* * * * *